March 1, 1949. N. FERRAEZ, JR 2,463,481
APPARATUS FOR COLLECTING LIQUID SEDIMENTS
Filed June 19, 1944
2 Sheets-Sheet 1
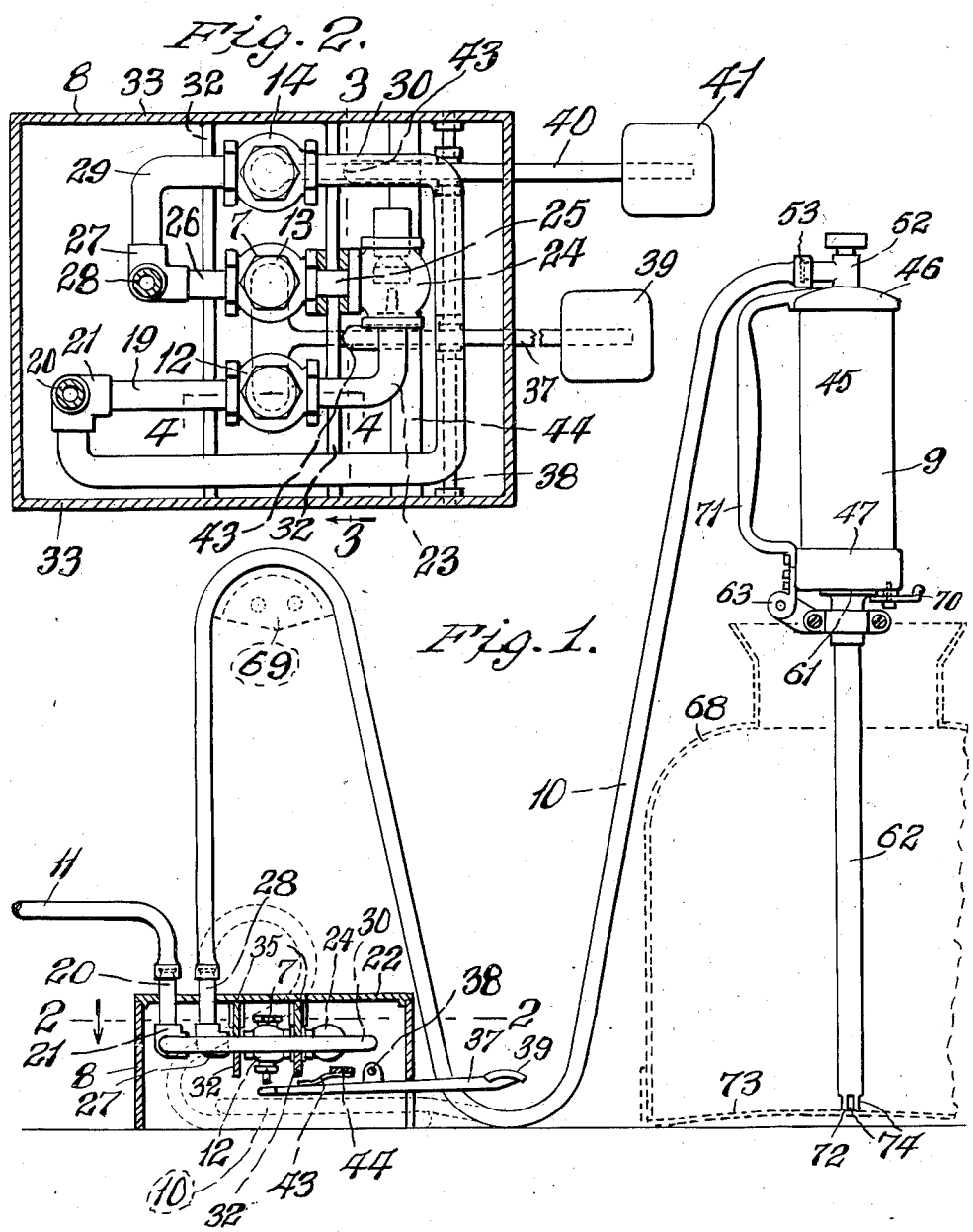
INVENTOR.
Nicolas Ferraez Jr.
BY Herbert G. Fletcher
atty.

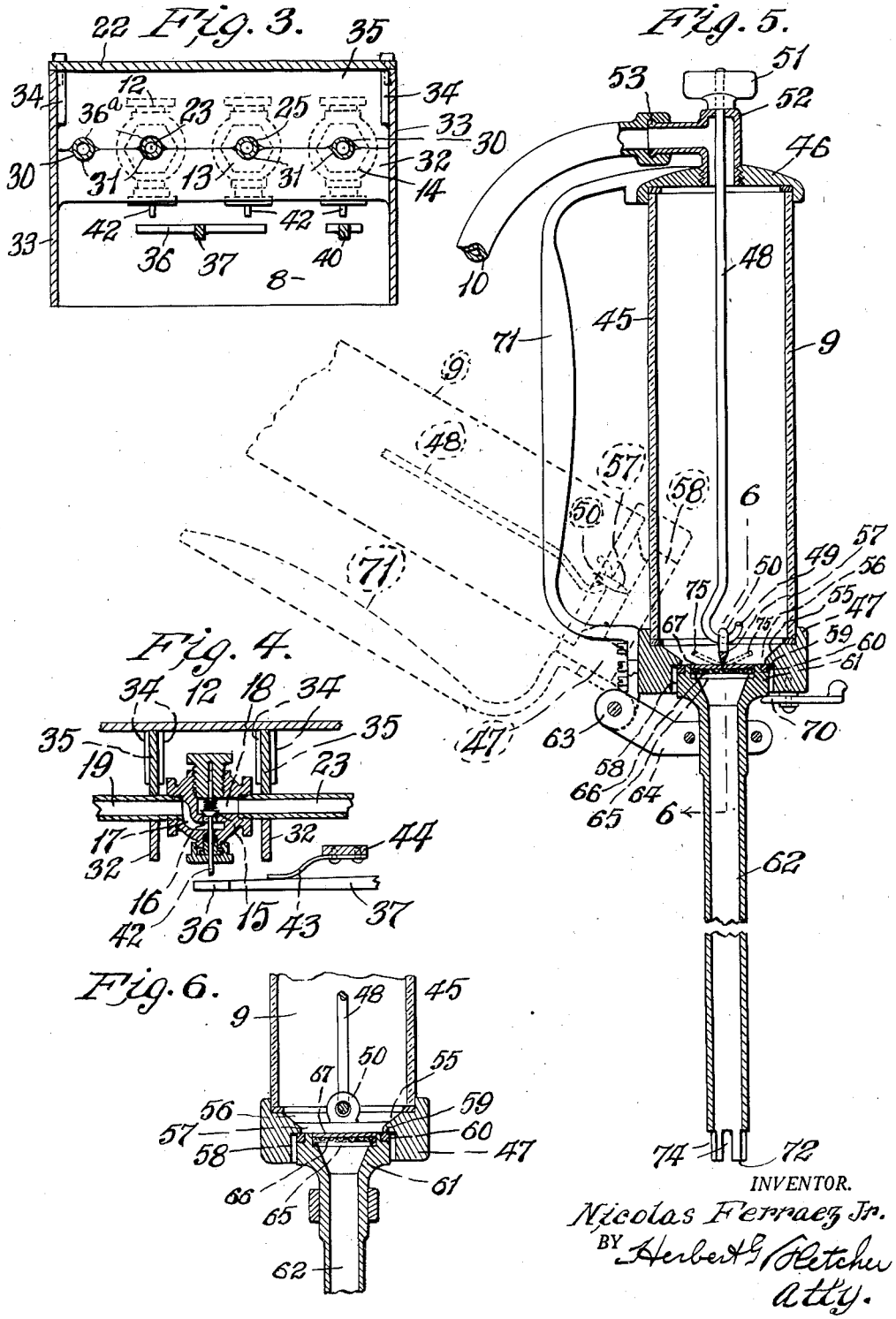

Patented Mar. 1, 1949

2,463,481

UNITED STATES PATENT OFFICE 2,463,481

APPARATUS FOR COLLECTING LIQUID SEDIMENTS

Nicolas Ferraez, Jr., St. Louis, Mo.

Application June 19, 1944, Serial No. 540,970

4 Claims. (Cl. 73—61)

1

This invention relates to improvements in apparatus for collecting and retaining sediments of liquids, such as milk, for subsequent use in analyzing the collected sediments for testing purposes in grading the milk.

Another object of the invention is in providing an apparatus for sediment testing with improvements for simplifying its operation of entraining and discharging liquid quantities for testing purposes.

A further object is in providing improved manually operated apparatus for entraining liquid quantities from milk or analogous material to be tested for foreign matters or sediment therein, and for forcing the entrained liquid quantity through a sediment collecting disc or pad.

Still another object is to provide the liquid retaining cylinder of the apparatus with a combined inlet and outlet passageway.

Still another object is to provide an improved portable apparatus which is complete in itself to enable the apparatus to be transported or moved to location for accessibility to a compressed air agency or line, for compressed air employment in the operation of the apparatus.

Still another object is to provide the apparatus with a combination of foot operated mechanisms.

Other objects and advantages will appear as this description progresses and by reference to the drawings in which:

Figure 1 is a side elevation partly in section, of this improved apparatus.

Figure 2 is an enlarged horizontal sectional elevation taken approximately on line 2—2 of Fig. 1.

Figure 3 is an enlarged transverse vertical sectional elevation taken approximately on the line 3—3 of Fig. 2.

Figure 4 is an enlarged fragmentary vertical sectional elevation taken approximately on the line 4—4 of Fig. 2

Figure 5 is an enlarged vertical sectional elevation taken through the combined receiving and discharging cylinder and its depending nozzle.

Figure 6 is an enlarged fragmentary vertical sectional elevation taken approximately on the line 6—6 of Fig. 5.

Referring by numerals to the several figures of the accompanying drawings, this improved apparatus comprises a set of valve mechanisms 7 which are disposed and secured in a portable box 8, for co-operation with the collecting container 9 through a flexible hose or tube 10, when the mechanisms 7 are in co-operation with a compressed air line 11.

2

The mechanisms 7 comprises the application and use of three control valves 12, 13 and 14, one of which is shown in detail in Fig. 4, and each having a spring actuated valve 15 controlling the valve opening 16 which communicate with the passageways 17 and 18.

A short tubular length 19 is connected at one end to the valve 12, and at its other end to a vertical tubular length 20 by the elbow fitting 21 which extends through the top wall 22 of the portable box 8.

Connected to the other end of the valve 12 is a tubular elbow 23 which is connected at its opposite end to an ejector 24, and connected to the ejector by the nipple 25 is the valve 13, which at its opposite end is connected to a nipple 26, said nipple in turn being connected to the elbow fitting 27 from which leads a vertical tubular length 28 which passes through the top wall 22 of the box 8.

Connected to the fitting 27 is a horizontal tubular elbow 29, which is connected to the valve 14, and connected to one end of said valve is a tubular length 30 which leads to and is connected with the fitting 21.

The valves 12, 13 and 14 are disposed on the same horizontal plane, and consequently their tubular connections are disposed in the same plane, and are seated in respective grooves 31 formed on the upper edges of a pair of transverse members 32, which are connected at their ends with the respective side walls 33 of the box 8 in the manner as shown in Fig. 3. Engaged at their ends in guides 34 are removable transverse members 35, having grooves 36a on the lower edges thereof in opposition to the grooves 31 of the respective transverse members 32, for over-engaging the horizontal tubular connections of the valves 12, 13 and 14.

The transverse members 35 are firmly held in seated position on the respective transverse member 32 by the top wall 22 of the box 8.

The valves 12 and 13 are operated in unison by the transverse bar 36 at the inner end of a foot lever or treadle 37, which is intermediately swingable on the transverse rod 38, said lever having a foot-end 39.

For operating the valve 14, a foot lever 40 is provided, said lever also being swingingly mounted on the rod 38 and having a foot end 41, and for normally holding the foot levers 37 and 40 out of engagement with the valve stems 42 of the respective valves, a respective leaf spring 43 engages each of the foot levers 37 and 40 on their inner ends, said spring being secured to and depending from a cross member 44 which is supported by the side walls 33 of the box 8.

The collecting container 9 comprises a transparent plastic cylinder 45 which is secured between the upper head 46 and lower head 47 by a tie-rod 48 having a hook 49 on its lower end engaging an eye-member 50, the upper end of said rod being threaded and having a wing-nut 51 engaging the threaded end and in tying abutment with the elbow 52 on the head 46.

Connected to the end 53 of the elbow 52 is one end of the hose 10, the other end of said hose being connected to the extending end of the tubular length 28 of the mechanisms 7 in the box 8.

The lower or bottom head 47 of the cylinder 45 is provided with a downwardly tapering circular wall 55 forming a well 56 and secured at its ends to the wall 55 is a horizontal transverse bar 57 which is triangular in shape in cross section to provide a knife-edge on its lower end. The eye-member 50 is secured to and extended from the transverse bar 57.

A circular pocket 59 is formed on the under side of the head 47 and is of a diameter to form an annular shoulder 59 beneath the tapering wall 55 of the well 56, said shoulder 59 forming a seat for the gasket 60 on the head 61 of a nozzle or tube 62 through which liquids to be tested are entrained to the container 9 and subsequently discharged therefrom.

The tube 62 is swingingly connected by the hinge 63 to the lower head 47 of the container 9 by a bracket 64 clamped to the tube 62, said bracket 64 forming a part of the hinge 63.

The head 61 of the tube 62 is provided with a concentrically disposed seat 65, in which a screen disc 66 is held, for the support of a porous disc 67 which may be made from compressed cotton or the like.

This improved apparatus is relatively small in size so that the box 8 containing the mechanisms 7 can be carried by one arm of the operator and the collecting container 9 carried by the other arm or hand of the operator, the flexible hose 10 if desired being disconnected from either the container 9 or the tubular length 28 extending through the top wall of the box 8.

The purpose of making the apparatus portable is so that it can be readily transported to a more convenient place of operation in a dairy plant or to other divisions of the plant which may be separately located in a community, and in which the hose connection 10 need only be of a length to permit the nozzle 62 of the container 9 to be lowered into and removed from a milk can or container 68, and for clarity the hose connection in Fig. 1 is shown in full lines and engaged over a hanger 69 shown in dotted lines, although in practise the hose connection can be entrained on the floor in the manner as shown in dotted lines.

In the operation of the apparatus for testing or grading milk after it is delivered to the dairy in cans from farms at different locations, the air line connection 11 is connected to an adjacent compressed air source (not shown) in readiness for operating the mechanisms 7 in the portable box 8, for the purpose of testing and grading the milk from each can.

As the filled milk cans 68 are positioned adjacent the operator in readiness for testing, and the operator has previously placed an identifying porous disc 67 in the seat 65 on the screen 66 of the head 61, this being done by the operator releasing the latch 70 from engagement under the head 61 of the nozzle 62, and allowing the nozzle 62 to swing away from the collecting container 9, or by the operator swinging the container 9 to an approximate position shown in dotted lines in Fig. 5, as the operator manipulates the container by his grasp on the handle 71 on the container.

The container 9 is then swung into an approximate vertical position to allow the head 61 of the nozzle 62 to swing back into the circular pocket 58 of the lower head 47 of the container, and the latch 70 is manipulated to secure the gasket 60 of the head 61 in sealing engagement against the annular shoulder 59 of the head 47.

The operator then engages the nozzle 62 of the collecting container 9 in the milk in the can 68, and in the event the lower end 72 of the nozzle is rested on the can bottom 73, slots 74 are provided in the lower end of the nozzle for milk entrainment therein.

As the nozzle 62 of the collecting container 9 is inserted in the milk can 68, the operator will engage the foot end or pedal 39 of the lever 37 and press it downwardly and the transverse bar 36 of said lever will engage the stems 42 of the valves 12 and 13, so that compressed air from the line 11 can pass through the valve 12 and enter the ejector 24, and as the valve 13 is also open, the ejector will cause air to be entrained through the tube 10 from the collecting container 9, and the suction created in the cylinder 45 of said container and nozzle 62, will cause opposing portions 75 of the porous disc 67 to be drawn upwardly from the seat 65, and a quantity of milk from the can 68 will be entrained in the cylinder 45 of the container 9, past the uplifted portions 75 of the porous disc.

The reason that the disc 67 will have its opposed portions 75 upwardly raised as shown in dotted lines in Fig. 5, is because the lower knife edge of the transverse bar 57 is centrally engaged against and across the disc. As the cylinder 45 of the container 9 is of transparent plastic material, the operator can readily see whether a sufficient milk quantity has been entrained in to the cylinder, and at that instant foot pressure on the lever 37 is released so that the transverse bar or portion 36 of said lever will be released from engagement with the valve stems 42 of the respective valves 12 and 13 by the leaf spring 43 bearing downward against the lever. The valves 12 and 13 will then be closed by release of the lever 37, and the operator will then immediately engage and downwardly press the lever end 41 of the lever 40, thereby pushing the stem 42 of the valve 14 upwardly and causing compressed air from the line 11 to enter the tubular length 30, and pass through the valve 14 and enter the tubular length 28 through the elbow 29, and into the tube 10 to the cylinder 45 of the collecting container 9. The compressed air entering the cylinder 45 on the entrained liquid, will force the upwardly bent portions 75 of the disc 67 downwardly against the seat 65 of the head 61 of the nozzle 62, and the entrained quantity of milk in the container 9 will be forced through the flattened porous disc 67 and through the nozzle 62 for returning the milk to the can 68.

During the return of the entrained milk to the can 68 through the porous disc 67, said disc will catch and retain the heavy milk particles or sediments for subsequent inspection, the sediment loaded disc being removed from its seat in the head 61 of the tube 62 after the tube has been swung away from head seated engagement in the pocket 58 by releasing the latch 70 from beneath the head.

The screen disc 66 being somewhat resiliently yieldable, will tend to outwardly thrust the porous disc 67 therefrom as the head 61 is swung from the seat 59 of the cylinder head 47, thereby assisting in the removal of the sediment loaded porous disc.

After the removal of the sediment loaded disc, a new disc is reseated in the head 61 and the head is then swung into the gasket seating position within the shoulder 59 of the head 47 of the collecting container 9, and the nozzle 62 is placed in the next can of milk to be tested, and the foot levers 37 and 40 are again respectively operated for entraining and discharging a quantity of milk into and from the container 9, similar successive operations being carried on for testing milk of successive cans.

The sediment loaded discs upon each being removed from the seat 65 in the head of the nozzle 62, are each mounted on an identifying card where they are permitted to dry for subsequent inspection, microscopic or otherwise, by chemists and the like, to determine of what the collected sediments of each disc consists, for a complete grading of the milk to which they pertain.

The invention of this application is a furthering of the invention of my U. S. Letters Patent 2,055,252, disclosing a cyclically operable device which is built up as a complete machine and held in a fixed place, the instant application going to a simplification of the original invention, lends itself for portability on account of its light weight construction, and having the capacity for manual operation by foot levers or the like, by the operator, the only requirement being to attach the apparatus to an adjacent air pressure line for power in the operation of the mechanisms thereof.

While a preferred embodiment of the invention is shown, it is to be understood that various changes, size, shape and arrangements of parts, may be resorted to without departing from the spirit and scope of the claims appended hereto.

What I claim is:

1. A collecting container for liquid sediments comprising a transparent cylinder having respective heads; a passageway through each head; the lower of said heads having a straining disc holding element swingably connected thereto, for cooperation with the passageway of said lower head; said lower head being provided with a chamber having an inverted annular seat therein; a cross bar in said chamber having its lower edge in approximate flush alinement with said seat; and a straining disc carried by said swingable element for cooperation with said seat and the cross bar thereof, when said element is swung into cooperation with the passageway of the lower head.

2. An apparatus for collecting liquid sediments comprising an air tube; a container coupled with said tube; said container having a combined inlet and outlet passageway; a straining disc in said passageway; a vacuum creating means cooperable with said tube for entraining liquid through said passageway and into said container; and pressure creating means cooperable with said tube for forcing the liquid entrained into said container through said disc; said tube forming the sole means of operating connection with said vacuum creating means, said pressure creating means and said container.

3. A sediment tester comprising a container; an air tube; said container having a passageway communicating with said tube; a second passageway leading to said container; a vacuum creating means cooperable with said tube for entraining liquid into said container through said second passageway; a lever cooperable with said vacuum creating means; pressure creating means separately cooperable with said tube for discharging the entrained liquid from said container through said second passageway; and a lever for operating said pressure means; said tube forming the sole means of operating connection with said vacuum creating means, said pressure creating means and said container.

4. A sediment tester comprising a container with a passageway therethrough; an air tube communicating with the upper end of said passageway; operating mechanism cooperable with said container through said air tube; said mechanism having a vacuum creating means, a pressure creating means and a pair of operable levers; one of said levers adapted to actuate said vacuum creating means to cause a suction in said air tube, to entrain liquid into said container through said passageway; said other lever adapted to actuate said pressure creating means to cause a pressure to enter said container through said air tube, to force the entrained liquid from the container; said air tube forming the sole means of operating connection with said vacuum creating means, said pressure creating means and said container.

NICOLAS FERRAEZ, Jr.

REFERENCES CITED

The following references are of record in the file of this patent:

UNITED STATES PATENTS

| Number | Name | Date |
| --- | --- | --- |
| 1,893,735 | Evers | Jan. 10, 1933 |
| 1,963,080 | Featherstone | June 19, 1934 |
| 2,055,252 | Ferraez, Jr. | Sept. 22, 1936 |
| 2,099,038 | Shikles | Nov. 16, 1937 |
| 2,177,060 | Drew | Oct. 24, 1939 |
| 2,187,514 | Gardner | Jan. 16, 1940 |
| 2,225,984 | Erekson | Dec. 24, 1940 |
| 2,345,290 | Roesch | Mar. 28, 1944 |

FOREIGN PATENTS

| Number | Country | Date |
| --- | --- | --- |
| 24,498 | Netherlands | July 15, 1931 |